Figure 1:
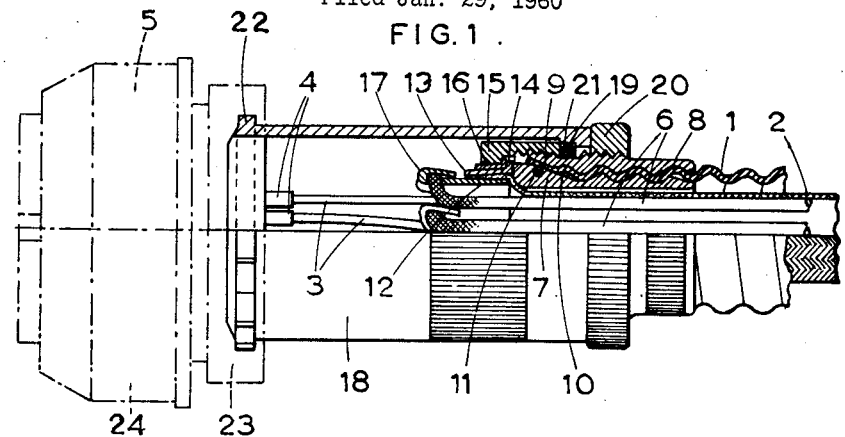

May 29, 1962     J. W. WILSON     3,037,069
END FITTINGS FOR FLEXIBLE ELECTRICAL CONDUITS
Filed Jan. 29, 1960

INVENTOR
John William Wilson
BY
Dean, Fairbank & Hirsch
ATTORNEYS

United States Patent Office 3,037,069
Patented May 29, 1962

3,037,069
END FITTINGS FOR FLEXIBLE ELECTRICAL
CONDUITS
John William Wilson, Slough, England, assignor to Superflexit Limited, Slough, England
Filed Jan. 29, 1960, Ser. No. 5,467
Claims priority, application Great Britain Jan. 30, 1959
1 Claim. (Cl. 174—89)

This invention relates to end fittings for use with flexible electrical conduits intended to contain a number of individual electrical conducting wires which are bunched together within the conduit and are intended to be soldered to a corresponding number of soldering tags or like parts on electrical pins or sockets carried by a multi-pin or multi-socket head for making electrical connection with registering sockets or pins on an adjacent part.

The end fitting has certain features in common with those forming the subject of the co-pending patent application No. 757,065 and British patent application No. 27,518/58, it being preferred to employ conduiting of helical formation.

Such conduiting together with its associated end fittings is particularly suitable for use on aircraft, rockets or guided missiles where it is often necessary to use a large number of individual electrical conductors which as previously explained are bunched together within the conduit as distinct from being in the form of a multi-core cable. Such conduiting and end fittings may, for example, take the form of a harness in which case the harness could be of quite complicated form. Such a harness could therefore be supplied complete with end fittings to a manufacturer ready to make a plug-in connection with the parts with which it is to be associated.

In order to solder the various electrical conductors to the soldering tags of the head it was necessary to force back the end of the conduit which was not an easy thing to do owing to the inherent rigidity of the conduiting material.

The chief object of the invention therefore is to make certain improvements in such end fittings which will render the soldering points easily accessible without the necessity to force back the conduit end.

The invention consists broadly in the provision of a sleeve or sleeve nut which serves to enclose the soldering points and connect the external sleeve and internal nipple with the multi-pin or muti-socket head, the sleeve or sleeve nut being retractible over the internal nipple, external sleeve and conduit to expose the soldering points and render them accessible.

Some or all of the conducting wires may have an outer screening metallic covering which it may be necessary to connect or earth to a part of the end fitting and this retractibility of the sleeve or sleeve nut is particularly useful in such a case as the extremities of the braided or other metallic screening covering will be both visible and easily accessible enabling any soldering or other connections to be easily made.

Figure 2:
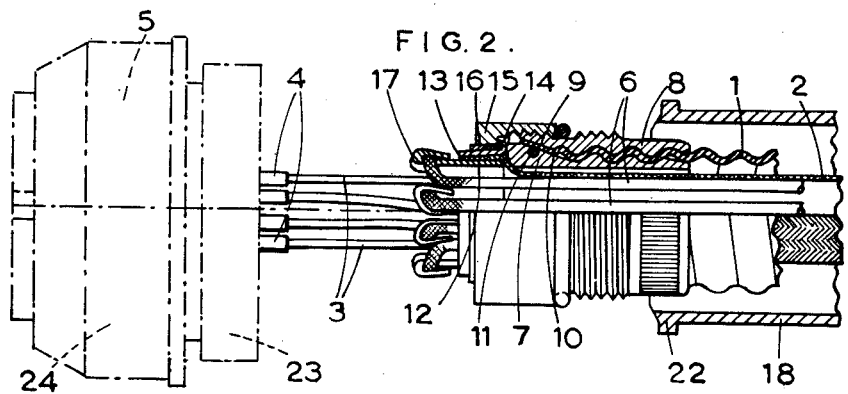
Figure 3:
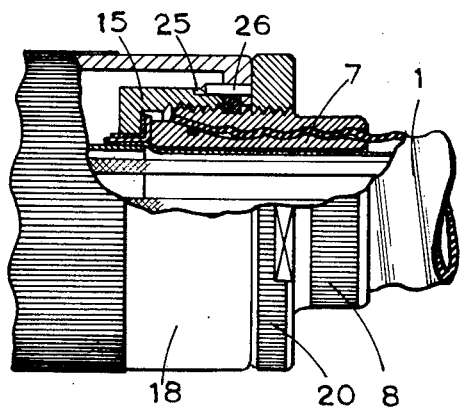

Referring to the accompanying drawings:
FIGURE 1 is a longitudinal section of an end fitting in accordance with the invention and applied to a helically convoluted conduit containing a number of electrically screened conductors.
FIGURE 2 is a similar view but showing the outer sleeve retracted for access to the soldered connections.
FIGURE 3 is a longitudinal section illustrating a modification.

The invention is shown applied to an end fitting associated with a helically convoluted conduit 1 containing an outer braided metal screen 2 enclosing a bunch of electrical conductors 3 having soldered connections with soldering tags 4 on a multi-socket head 5, each electrical conductor 3 being enclosed in a braided metal screen 6.

The fitting includes an internal nipple 7 and an external sleeve 8, the nipple being externally threaded and the sleeve internally threaded to receive the helically convoluted conduit 1, the latter being composed of polyvinylchloride or other suitable electrical insulating material, the sleeve and nipple being formed with oppositely positioned part conical faces 9 and 10 between which the extremity of the conduit is gripped as a result of screwing the sleeve onto the nipple with the conduit therebetween. To improve the seal between the nipple and conduit the part conical face 10 of the nipple is formed with an annular recess in which is located an O-type sealing ring 11 which makes sealing engagement with the inner surface of the conduit.

The tubular metal screen 2 if provided is sandwiched between an inner screening sleeve 12 and an outer screening sleeve 13, the latter being formed with a longitudinally arranged slot to permit of expansion to receive the screen 2 and haivng a flange 14 to engage the end of the nipple 7, the outer sleeve 13 being maintained in position by a sleeve retaining nut 15 in threaded engagement with the sleeve 8. A screening sleeve insulating washer 16 may be provided between the sleeve 13 and nut 15.

The inner sleeve 12 is provided at its outer end with a series of tangs or fingers 17 which can be bent over the extremities of the metallic individual conductor screens 6 and soldered thereto.

Soldering points of the conductors 3 and fingers 17 are enclosed by a retractible tubular sleeve 18 which can be slid back for access to the soldered connections which has an inwardly directed flange 19 at its inner end which is engaged by an externally knurled, lock nut 20, the latter screwing onto the sleeve 8. An O type sealing ring 21 is located within a shallow recess in the sleeve 18, and fits closely around the nipple 7, the sealing ring engaging the rearward end of retaining nut 15 to ensure a good seal between the parts.

The sleeve 18 has an outwardly directed broken peripheral flange 22 at its outer end which is engaged by a ring nut 23 by means of which the sleeve 18 is connected with multi-pin or multi-socket head 24 or other part to which the various electrical conductors are to be connected.

It will be appreciated that with this arrangement, release of the lock nut 20 and ring nut 23 will allow the sleeve 18 to be retracted over the conduit into a position in which the soldered connections, and outer screen and individual screens on the conduit cables, if provided, will be accessible.

The retractible sleeve 18 may have a rubber or other type sealing washer or grommet interposed between the flange 22 and the multi-pin head 24, which will be compressed as a result of tightening the ring nut 23 to ensure a good seal.

Instead of providing the retractible sleeve 18 with a peripheral flange 22, it may be internally screw-threaded whereby it may be screwed on to a correspondingly screw-threaded part of the multi-pin head, the retractible sleeve which in this case takes the form of a sleeve nut being again locked by means of the lock nut hereinbefore referred to.

As in some cases rotational movement of the head might cause accidental slackening of the sleeve or sleeve nut, a locking washer may be provided interposed between the lock nut and the extremity of the retractible sleeve, the locking washer being formed with an inwardly projecting projection for engaging a recess in the threaded part of the outer conduit receiving sleeve, and an axial projection for engaging a notch in the extremity of the retractible sleeve, the action of tightening the lock nut serving to bring about interengagement of the washer and retractible sleeve and preventing relative rotational movement between the retractible sleeve and the outer conduit receiving sleeve, which might, if permitted result in accidental loss of grip of the conduit receiving sleeve and internal nipple of the conduit.

In order to lock the retaining nut 15 and retractible sleeve 18 together against relative rotational movement, the retaining nut 15 may, as shown in FIGURE 3, be provided with one or more recesses 25 in its peripheral surface for the entry of a locking pin 26 located in a boring in the flange 19 on the retractible sleeve 18.

It will be appreciated, therefore, from the foregoing description, that the conduit receiving sleeve and internal nipple can be engaged with the conduit and the screen 2 surrounding the bunch of electrical conductors engaged between the outer and inner screening sleeves before the soldered connections are made between the electrical conductors and the soldering tags on the multi-pin head and that any earthing connections which are to be made between either the screen enclosing the bunch of conductors or individual screens surrounding individual conductors can be made before the retractible sleeve is advanced into connection with the multi-pin head or similar component part. Furthermore, if it is desired at any time to make additional soldered connections, these can easily be made by retracting the sleeve into a position in which the parts are readily visible and accessible.

I claim:

The end fitting assembly of the kind set forth for a plurality of electrical conductors each of the type surrounded by a tubular metallic screen, comprising a sleeve member, an external sleeve and an internal nipple, a multiple connector head to which the ends of the electrical conductors are soldered to define a plurality of soldering points, said sleeve member encompassing said soldering points, an outer tubular metallic screen through which said conductors extend, inner and outer screening sleeves gripping therebetween the end of said outer tubular screen, said outer screening sleeve having a peripheral flange, a retaining nut in threaded engagement with the external sleeve retaining said peripheral flange in contact with the end of said nipple, said inner screening sleeve having a plurality of spaced soldering fingers for attachment respectively of the tubular metallic screens enclosing the individual electrical conductors, said sleeve member connecting said external sleeve and internal nipple with said multiple connector head, an insulating conduit through which said electrical conductors extend, said conduit being clamped between said external sleeve and internal nipple, said sleeve member being retractible over the internal nipple, external sleeve and said conduit to expose the soldering points and render them accessible.

References Cited in the file of this patent

UNITED STATES PATENTS

| 428,046 | Hanagin | May 13, 1890 |
| 2,411,861 | Antony et al. | Dec. 3, 1946 |

FOREIGN PATENTS

| 460,156 | Great Britain | Jan. 22, 1937 |
| 647,335 | Great Britain | Dec. 13, 1950 |
| 654,500 | Great Britain | June 20, 1951 |